United States Patent
Arai

(10) Patent No.: US 11,453,808 B2
(45) Date of Patent: Sep. 27, 2022

(54) ADHESIVE COMPOSITION FOR ELECTRICAL STORAGE DEVICE, FUNCTIONAL LAYER FOR ELECTRICAL STORAGE DEVICE, ELECTRICAL STORAGE DEVICE, AND METHOD OF PRODUCING ELECTRICAL STORAGE DEVICE

(71) Applicant: ZEON CORPORATION, Tokyo (JP)

(72) Inventor: Kenji Arai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 241 days.

(21) Appl. No.: 16/754,744

(22) PCT Filed: Oct. 10, 2018

(86) PCT No.: PCT/JP2018/037788
§ 371 (c)(1),
(2) Date: Apr. 9, 2020

(87) PCT Pub. No.: WO2019/082658
PCT Pub. Date: May 2, 2019

(65) Prior Publication Data
US 2020/0317967 A1    Oct. 8, 2020

(30) Foreign Application Priority Data
Oct. 27, 2017   (JP) .............. JP2017-208593

(51) Int. Cl.
| | | |
|---|---|---|
| *C09J 133/02* | (2006.01) | |
| *C08F 220/06* | (2006.01) | |
| *H01G 11/52* | (2013.01) | |
| *H01G 11/84* | (2013.01) | |
| *H01M 10/0585* | (2010.01) | |
| *H01M 50/46* | (2021.01) | |

(52) U.S. Cl.
CPC ............ *C09J 133/02* (2013.01); *C08F 220/06* (2013.01); *H01G 11/52* (2013.01); *H01G 11/84* (2013.01); *H01M 10/0585* (2013.01); *H01M 50/461* (2021.01); *C08F 2800/20* (2013.01)

(58) Field of Classification Search
CPC .. H01M 50/461; H01M 10/058; H01M 50/42; H01M 50/449
See application file for complete search history.

(56) References Cited

U.S. PATENT DOCUMENTS

2018/0287189 A1    10/2018   Maruhashi et al.
2019/0044148 A1    2/2019    Norikazu

FOREIGN PATENT DOCUMENTS

| JP | 2015138768 A | 7/2015 |
|---|---|---|
| JP | 2015141838 A | 8/2015 |
| WO | 2017073022 A1 | 5/2017 |
| WO | 2017141791 A1 | 8/2017 |

OTHER PUBLICATIONS

English translation of JP 2015-141838 to Hiroshi et al. Translation obtained via Google Patents Mar. 10, 2022. (Year: 2015).*
Apr. 28, 2020, International Preliminary Report on Patentability issued in the International Patent Application No. PCT/JP2018/037788.
Apr. 29, 2021, the Extended European Search Report issued by the European Patent Office in the corresponding European Patent No. 18870960.4.
Brahim Erol, Copolymers of 2-(3-(6-tetralino)-3-methyl-1-cyclobutyl)-2-Hydroxyethyl Methacrylate with Acrylonitrile and 4-Vinylpyridine: Synthesis, Characterization, and Monomer Reactivity Ratios, Journal of Macromolecular Science, Part A: Pure and Applied Chemistry, 2008, pp. 555-562, vol. 45, No. 7.
Nov. 20, 2018, International Search Report issued in the International Patent Application No. PCT/JP2018/037788.

* cited by examiner

*Primary Examiner* — Sarah A. Slifka
(74) *Attorney, Agent, or Firm* — Kenja IP Law PC

(57) ABSTRACT

An adhesive composition for an electrical storage device contains a polymer A and a solvent. The polymer A includes an alicyclic (meth)acrylic acid ester monomer unit in a proportion of not less than 50.0 mass % and not more than 90.0 mass %, and also includes a nitrile group-containing monomer unit.

8 Claims, No Drawings

ADHESIVE COMPOSITION FOR ELECTRICAL STORAGE DEVICE, FUNCTIONAL LAYER FOR ELECTRICAL STORAGE DEVICE, ELECTRICAL STORAGE DEVICE, AND METHOD OF PRODUCING ELECTRICAL STORAGE DEVICE

TECHNICAL FIELD

The present disclosure relates to an adhesive composition for an electrical storage device, a functional layer for an electrical storage device, an electrical storage device, and a method of producing an electrical storage device.

BACKGROUND

Electrical storage devices including batteries, secondary batteries, capacitors, and the like are used in a wide variety of applications. These electrical storage devices have a configuration in which two electrodes having different attributes are isolated from one another by an isolating component such as a separator. In other words, an electrical storage device generally includes a plurality of types of components such as two electrodes having different ionization tendencies and a separator.

There are cases in which a component including a functional layer that contains particles compounded in order to cause the component to display a desired function (hereinafter, referred to as "functional particles") and other ingredients is used as a component included in an electrical storage device.

In one example, a separator that includes a porous membrane layer containing a binder and non-conductive particles serving as functional particles on a separator substrate may be used as a separator of an electrical storage device. In another example, an electrode that includes an electrode mixed material layer containing a binder and electrode active material particles serving as functional particles on a current collector, or an electrode that further includes a porous membrane layer such as described above or the like on an electrode substrate including an electrode mixed material layer on a current collector may be used as an electrode of an electrical storage device.

In recent years, attempts have been made to improve adhesive compositions for electrical storage devices in order to achieve further improvement of electrical storage device performance. For example, Patent Literature (PTL) 1 proposes an adhesive layer containing a thermoplastic polymer that includes a cycloalkyl group-containing ethylenically unsaturated monomer unit in a proportion of 10 mass % to 90 mass % and that also includes one or more types of monomer units selected from the group consisting of a carboxyl group-containing ethylenically unsaturated monomer unit, an amide group-containing ethylenically unsaturated monomer unit, a hydroxyl group-containing ethylenically unsaturated monomer unit, and a cross-linkable monomer unit as other monomer units. This adhesive layer can increase adhesiveness between a separator and an electrode included in an electrical storage device and can increase the cycle life of the electrical storage device including the adhesive layer.

CITATION LIST

Patent Literature

PTL 1: JP 2015-138768 A

SUMMARY

Technical Problem

However, an adhesive layer that is in accordance with the conventional technique described above leaves room for improvement in terms of the adhesiveness that can be displayed by the adhesive layer after an electrical storage device including the adhesive layer is repeatedly charged and discharged for use. In other words, there is room for improvement of an adhesive layer that can be formed in accordance with the conventional technique in terms of improving post-cycling adhesiveness. There is also room for improvement of low-temperature output characteristics of an electrical storage device that is in accordance with the conventional technique.

Accordingly, one objective of the present disclosure is to provide an adhesive composition for an electrical storage device capable of forming a functional layer for an electrical storage device that has excellent post-cycling adhesiveness and can improve low-temperature output characteristics of an electrical storage device.

Another objective of the present disclosure is to provide a functional layer for an electrical storage device that has excellent post-cycling adhesiveness and can improve low-temperature output characteristics of an electrical storage device.

Yet another objective of the present disclosure is to provide an electrical storage device that has excellent low-temperature output characteristics and a production method that enables good production of this electrical storage device.

Solution to Problem

The inventor conducted diligent investigation with the aim of solving the problems set forth above. The inventor discovered that an adhesive composition for an electrical storage device containing a polymer that includes 50.0 mass % or more of an alicyclic (meth)acrylic acid ester monomer unit and that also includes a nitrile group-containing monomer unit can be used to form a functional layer for an electrical storage device having excellent post-cycling adhesiveness, and also discovered that an electrical storage device including this functional layer for an electrical storage device can display excellent low-temperature output characteristics. In this manner, the inventor completed the present disclosure.

Specifically, the present disclosure aims to advantageously solve the problems set forth above by disclosing an adhesive composition for an electrical storage device comprising a polymer A and a solvent, wherein the polymer A includes a nitrile group-containing monomer unit and an alicyclic (meth)acrylic acid ester monomer unit, and the polymer A includes the alicyclic (meth)acrylic acid ester monomer unit in a proportion of not less than 50.0 mass % and not more than 90.0 mass %. An adhesive composition for an electrical storage device containing a polymer A that includes an alicyclic (meth)acrylic acid ester monomer unit in a proportion of not less than 50.0 mass % and not more than 90.0 mass %, and that also includes a nitrile group-containing monomer unit in this manner can form a functional layer for an electrical storage device that has excellent post-cycling adhesiveness and can improve low-temperature output characteristics of an electrical storage device.

Note that the proportion in which the alicyclic (meth)acrylic acid ester monomer unit is included in the polymer A can be measured by a nuclear magnetic resonance (NMR) method such as $^1$H-NMR. Moreover, the phrase "includes a monomer unit" as used with respect to a polymer in the present disclosure means that "a polymer obtained with the monomer includes a repeating unit derived from the monomer". Note that in the present specification, "(meth)acryl" is used to indicate "acryl" or "methacryl".

In the presently disclosed adhesive composition for an electrical storage device, an alicyclic structure of the alicyclic (meth)acrylic acid ester monomer unit preferably includes 5 to 12 carbon atoms. When the number of carbon atoms included in an alicyclic structure of an alicyclic (meth)acrylic acid ester monomer for the alicyclic (meth)acrylic acid ester monomer unit in the polymer A is 5 to 12, low-temperature output characteristics of an obtained electrical storage device can be further improved. Note that the number of carbon atoms included in the alicyclic structure of the alicyclic (meth)acrylic acid ester monomer for the alicyclic (meth)acrylic acid ester monomer unit included in the polymer A can be measured by $^1$H-NMR.

In the presently disclosed adhesive composition for an electrical storage device, the polymer A preferably includes the nitrile group-containing monomer unit in a proportion of not less than 0.1 mass % and not more than 45.0 mass %. When the polymer A includes the nitrile group-containing monomer unit in a proportion of not less than 0.1 mass % and not more than 45.0 mass %, a functional layer for an electrical storage device having even better post-cycling adhesiveness can be formed. Note that the proportion in which the nitrile group-containing monomer unit is included in the polymer A can be measured by $^1$H-NMR.

In the presently disclosed adhesive composition for an electrical storage device, the polymer A preferably has a volume-average particle diameter of not less than 160 nm and not more than 1,500 nm. By setting the volume-average particle diameter of the polymer A within the range set forth above, it is possible to increase the adhesive strength between components that can be displayed by a functional layer for an electrical storage device that contains the polymer A. Note that the "volume-average particle diameter" of the polymer A can be determined as a particle diameter that, in a particle diameter distribution measured by laser diffraction, is the particle diameter (D50) at which cumulative volume calculated from the small diameter end of the distribution reaches 50%.

It is preferable that the presently disclosed adhesive composition for an electrical storage device further comprises a polymer B and that a value obtained by dividing a volume-average particle diameter of the polymer A by a volume-average particle diameter of the polymer B is not less than 1.2 and not more than 10.0. When the adhesive composition for an electrical storage device contains a polymer B having a size relative to the volume-average particle diameter of the polymer A that satisfies the condition set forth above, the polymer B can act to favorably hold components contained in a functional layer for an electrical storage device, such as the polymer A, and can effectively inhibit detachment of the contained components from the functional layer for an electrical storage device. Note that the "volume-average particle diameter" of the polymer B can be determined in the same way as the volume-average particle diameter of the polymer A.

The present disclosure also aims to advantageously solve the problems set forth above by disclosing a functional layer for an electrical storage device formed using any one of the adhesive compositions for an electrical storage device set forth above. The presently disclosed functional layer for an electrical storage device has high post-cycling adhesiveness and can improve low-temperature output characteristics of an electrical storage device as a result of being formed using the presently disclosed adhesive composition for an electrical storage device.

The present disclosure also aims to advantageously solve the problems set forth above by disclosing an electrical storage device including the functional layer for an electrical storage device set forth above. The presently disclosed electrical storage device has excellent low-temperature output characteristics as a result of including the presently disclosed functional layer for an electrical storage device.

The present disclosure also aims to advantageously solve the problems set forth above by disclosing a method of producing an electrical storage device comprising: a stacking step of stacking two or more components among a plurality of components included in the electrical storage device, via the functional layer for an electrical storage device set forth above, to obtain a stack; and a pressing step of pressing the stack to adhere the two or more components to one another. The presently disclosed method of producing an electrical storage device enables adhesion, via the presently disclosed functional layer for an electrical storage device, of two or more components among a plurality of components that can be included in an electrical storage device, and thus enables good production of the presently disclosed electrical storage device having excellent low-temperature output characteristics.

In the presently disclosed method of producing an electrical storage device, it is preferable that the plurality of components of the electrical storage device includes two types of electrodes and a separator, the method further comprises a step of providing the functional layer for an electrical storage device on at least one side of the separator to form a functional layer-equipped separator at an earlier stage than the stacking step, and the functional layer-equipped separator and at least one of the two types of electrodes are stacked via the functional layer for an electrical storage device in the stacking step. This method of producing an electrical storage device enables good production of an electrical storage device having excellent low-temperature output characteristics.

Advantageous Effect

According to the present disclosure, it is possible to provide an adhesive composition for an electrical storage device capable of forming a functional layer for an electrical storage device that has excellent post-cycling adhesiveness and can improve low-temperature output characteristics of an electrical storage device.

Moreover, according to the present disclosure, it is possible to provide a functional layer for an electrical storage device that has excellent post-cycling adhesiveness and can improve low-temperature output characteristics of an electrical storage device.

Furthermore, according to the present disclosure, it is possible to provide an electrical storage device that has excellent low-temperature output characteristics and a production method that enables good production of this electrical storage device.

DETAILED DESCRIPTION

The following provides a detailed description of embodiments of the present disclosure.

The presently disclosed adhesive composition for an electrical storage device is an adhesive composition for use in the production of an electrical storage device. Moreover, the presently disclosed adhesive composition for an electrical storage device can be used to form various functional layers such as an electrode mixed material layer that is a functional layer displaying a function of giving and receiving electrons, a porous membrane layer (protective membrane layer) that is a functional layer displaying a function of reinforcing a component, and an adhesive layer displaying a function of adhering components inside an electrical storage device. Note that a porous membrane layer can also display adhering ability. The presently disclosed functional layer for an electrical storage device can be formed using the presently disclosed adhesive composition for an electrical storage device. Moreover, the presently disclosed electrical storage device includes the presently disclosed functional layer for an electrical storage device. Furthermore, the presently disclosed electrical storage device can be well produced through the presently disclosed method of producing an electrical storage device.

(Adhesive Composition for Electrical Storage Device)

The presently disclosed adhesive composition for an electrical storage device (hereinafter, also referred to simply as an "adhesive composition") contains a polymer A and a solvent. Features of the polymer A are that the polymer A includes a nitrile group-containing monomer unit and an alicyclic (meth)acrylic acid ester monomer unit, and that the polymer A includes the alicyclic (meth)acrylic acid ester monomer unit in a proportion of not less than 50.0 mass % and not more than 90.0 mass %. Note that besides the polymer A and the solvent, the presently disclosed adhesive composition preferably contains a polymer B having a different chemical composition and/or properties to the polymer A. The presently disclosed adhesive composition may further contain other components that differ from the polymer A and the polymer B.

The presently disclosed adhesive composition can increase post-cycling adhesiveness of an obtained functional layer for an electrical storage device (hereinafter, also referred to simply as a "functional layer") and can improve low-temperature output characteristics of an electrical storage device including the functional layer as a result of containing the polymer A that includes an alicyclic (meth)acrylic acid ester monomer unit in a proportion of not less than 50.0 mass % and not more than 90.0 mass %, and that also includes a nitrile group-containing monomer unit. Although it is not clear why this is the case, the reason is presumed to be as follows. Firstly, studies conducted by the inventor led to a new finding that through the alicyclic (meth)acrylic acid ester monomer unit that is included in the polymer A in a proportion of 50.0 mass % or more, an excessive increase in the degree of swelling in electrolyte solution of the polymer A can be effectively inhibited. It is thought that if an excessive increase in the degree of swelling in electrolyte solution of the polymer A can be inhibited, sufficient adhesiveness can be displayed by the polymer A even upon repeated charging and discharging of an electrical storage device. Moreover, the inclusion of a nitrile group-containing monomer unit in the polymer A is presumed to improve polymer strength of the polymer A itself, and this is presumed to significantly improve adhesiveness that can be displayed by the polymer A through a synergistic effect with the alicyclic (meth)acrylic acid ester monomer unit. On the other hand, further studies conducted by the inventor revealed that if the proportion in which the alicyclic (meth)acrylic acid ester monomer unit is included in the polymer A is too high, this may lead to an excessive decrease in the affinity of a functional layer with electrolyte solution and deterioration of low-temperature output characteristics of an obtained electrical storage device. Therefore, an obtained functional layer can be provided with good adhesiveness while also enhancing low-temperature output characteristics of an electrical storage device including the functional layer by setting an upper limit of 90.0 mass % or less for the proportion in which the alicyclic (meth)acrylic acid ester monomer unit is included in the polymer A.

<Polymer A>

Features of the polymer A are that the polymer A includes an alicyclic (meth)acrylic acid ester monomer unit in a proportion of not less than 50.0 mass % and not more than 90.0 mass %, and also includes a nitrile group-containing monomer unit. The polymer A having these features is a component that can display adhesiveness in a functional layer formed using the adhesive composition and, in particular, is a component that functions to improve post-cycling adhesiveness of the functional layer. Note that the polymer A is a water-insoluble particulate polymer. When a polymer is referred to as "water-insoluble" in the present specification, this means that when 0.5 g of particulate polymer is dissolved in 100 g of water at 25° C., insoluble content is 90 mass % or more.

[Alicyclic (Meth)Acrylic Acid Ester Monomer Unit]

Examples of alicyclic (meth)acrylic acid ester monomers that can form the alicyclic (meth)acrylic acid ester monomer unit include cycloalkyl acrylates such as acrylic acid ester monomers including a monocyclic cycloalkyl group (cyclohexyl acrylate, cyclohexylmethyl acrylate, menthyl acrylate, 2,2,5-trimethylcyclohexyl acrylate, etc.), acrylic acid ester monomers including a bicyclic cycloalkyl group (norbornyl acrylate, norbornylmethyl acrylate, bornyl acrylate, isobornyl acrylate, fenchyl acrylate, etc.), and acrylic acid ester monomers including a cycloalkyl group having three or more rings (adamantyl acrylate, tricyclo[$5,2,1,0^{2,6}$]decan-8-yl acrylate, tricyclo[$5,2,1,0^{2,6}$]decan-3 (or 4)-ylmethyl acrylate, etc.); and cycloalkyl methacrylates such as methacrylic acid ester monomers including a monocyclic cycloalkyl group (cyclohexyl methacrylate, cyclohexylmethyl methacrylate, menthyl methacrylate, 2,2,5-trimethylcyclohexyl methacrylate, etc.), methacrylic acid ester monomers including a bicyclic cycloalkyl group (norbornyl methacrylate, norbornylmethyl methacrylate, bornyl methacrylate, isobornyl methacrylate, fenchyl methacrylate, etc.), and methacrylic acid ester monomers including a cycloalkyl group having three or more rings (adamantyl methacrylate, tricyclo[$5,2,1,0^{2,6}$]decan-8-yl methacrylate, tricyclo[$5,2,1,0^{2,6}$]decan-3 (or 4)-ylmethyl methacrylate, etc.). One of these alicyclic (meth)acrylic acid ester monomers may be used individually, or two or more of these alicyclic (meth)acrylic acid ester monomers may be used in combination.

Of these alicyclic (meth)acrylic acid ester monomers, monomers for which the number of carbon atoms included in the alicyclic structure is 5 to 12 are preferable, and monomers for which the number of carbon atoms included in the alicyclic structure is 6 to 9 are more preferable. The "number of carbon atoms included in an alicyclic structure" referred to in the present specification is the number of ring-forming carbon atoms in the alicyclic structure and, in a case in which the alicyclic structure has a substituent, does not include the number of carbon atoms included in the substituent. When the number of carbon atoms included in the alicyclic structure is not less than any of the lower limits set forth above, an excessive increase in the degree of swelling in electrolyte solution of the polymer A can be effectively inhibited. Moreover, when the number of carbon atoms included in the alicyclic structure is not more than any of the upper limits set forth above, low-temperature output characteristics of an obtained electrical storage device can be further improved.

More specifically, of the monomers listed above, cyclohexyl acrylate (number of carbon atoms included in alicyclic structure: 6), cyclohexyl methacrylate (number of carbon atoms included in alicyclic structure: 6), and tricyclo[5,2,1,$0^{2,6}$]decan-8-yl methacrylate (number of carbon atoms included in alicyclic structure: 10) are preferable.

Moreover, the alicyclic (meth)acrylic acid ester monomer preferably includes a monocyclic cycloalkyl group as an alicyclic structure from a viewpoint of further improving post-cycling adhesive strength of a functional layer containing the polymer A. In other words, cyclohexyl acrylate (number of carbon atoms included in alicyclic structure: 6) and cyclohexyl methacrylate (number of carbon atoms included in alicyclic structure: 6) are more preferable as the alicyclic (meth)acrylic acid ester monomer.

The proportion in which the alicyclic (meth)acrylic acid ester monomer unit is included in the polymer A when all repeating units of the polymer A are taken to be 100.0 mass % is required to be not less than 50.0 mass % and not more than 90.0 mass %, is preferably 55.0 mass % or more, and more preferably 60.0 mass % or more, and is preferably 85.0 mass % or less, and more preferably 80.0 mass % or less. When the proportion in which the alicyclic (meth)acrylic acid ester monomer unit is included in the polymer A is not less than any of the lower limits set forth above, post-cycling adhesiveness of a functional layer containing the polymer A can be increased. Moreover, when the proportion in which the alicyclic (meth)acrylic acid ester monomer unit is included in the polymer A is not more than any of the upper limits set forth above, low-temperature output characteristics of an electrical storage device including a functional layer containing the polymer A can be improved.

[Nitrile Group-Containing Monomer Unit]

Examples of nitrile group-containing monomers that can form the nitrile group-containing monomer unit included in the polymer A include α,β-ethylenically unsaturated nitrile monomers. Any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; α-alkylacrylonitriles such as methacrylonitrile and α-ethylacrylonitrile; and vinylidene cyanide. Of these nitrile group-containing monomers, acrylonitrile and methacrylonitrile are preferable, and acrylonitrile is more preferable.

One of these nitrile group-containing monomers may be used individually, or two or more of these nitrile group-containing monomers may be used in combination.

The proportion in which the nitrile group-containing monomer unit is included in the polymer A when all repeating units of the polymer A are taken to be 100.0 mass % is preferably 0.1 mass % or more, and more preferably 5.0 mass % or more, and is preferably 45.0 mass % or less, and more preferably 30.0 mass % or less. When the proportion in which the nitrile group-containing monomer unit is included in the polymer A is within any of the ranges set forth above, post-cycling adhesiveness of a functional layer containing the polymer A can be further improved. This is presumed to be a consequence of adhesive strength of a functional layer containing the polymer A increasing due to increased polymer strength of the polymer A itself when the proportion in which the nitrile group-containing monomer unit is included in the polymer A is not less than any of the lower limits set forth above. This is also presumed to be a consequence of an excessive rise in the glass-transition temperature of the polymer A being inhibited and adhesive strength of a functional layer containing the polymer A increasing when the proportion in which the nitrile group-containing monomer unit is included in the polymer A is not more than any of the upper limits set forth above. Moreover, by setting the proportion in which the nitrile group-containing monomer unit is included in the polymer A as not more than any of the upper limits set forth above, internal resistance of an obtained electrical storage device can be reduced, and thus low-temperature output characteristics of the electrical storage device can be enhanced.

[Other Monomer Units]

The polymer A may include other monomer units besides the monomer units described above. Examples of monomers that can form such other monomer units include acidic group-containing monomers, (meth)acrylic acid alkyl ester monomers (excluding alicyclic (meth)acrylic acid ester monomers), aliphatic conjugated diene monomers, aromatic vinyl monomers, amide group-containing monomers, and cross-linkable monomers. One of these monomers may be used individually, or two or more of these monomers may be used in combination. Of these monomers, it is preferable that an acidic group-containing monomer is included in the polymer A.

Examples of acidic group-containing monomers include monomers that include an acidic group such as carboxy group-containing monomers, sulfo group-containing monomers, and phosphate group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", and "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, monocarboxylic acids are more preferable, and (meth)acrylic acid is even more preferable.

Examples of (meth)acrylic acid alkyl ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate, and 2-hydroxyethyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and 2-hydroxyethyl methacrylate. One of these (meth)acrylic acid alkyl ester monomers may be used individually, or two or more of these (meth)acrylic acid alkyl ester monomers may be used in combination. Of these (meth)acrylic acid alkyl ester monomers, 2-ethylhexyl (meth)acrylate is preferable.

Examples of aliphatic conjugated diene monomers include 1,3-butadiene, 2-methyl-1,3-butadiene (isoprene), and 2,3-dimethyl-1,3-butadiene.

Examples of aromatic vinyl monomers include styrene, styrene sulfonic acid and salts thereof, α-methylstyrene, butoxystyrene, and vinylnaphthalene.

Examples of amide group-containing monomers include N-vinylacetamide, acrylamide, 2-acrylamido-2-methylpropane sulfonic acid (AMPS), and N-methylol (meth)acrylamide.

Examples of cross-linkable monomers include polyfunctional monomers including two or more groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers including an epoxy group such as allyl glycidyl ether and glycidyl methacrylate; and γ-methacryloxypropyltrimethoxysilane. Of these cross-linkable monomers, di(meth)acrylic acid ester monomers are preferable, and ethylene glycol dimethacrylate is particularly preferable.

With regards to the proportion in which other monomer units are included in the polymer A, the proportion of a single type of other monomer unit in a case in which only a single type of monomer unit is included as another monomer unit or the total proportion of a plurality of types of other monomer units in a case in which a plurality of types of monomer units are included as other monomer units preferably satisfies any of the preferred ranges set forth below. In other words, the proportion in which other monomer units are included in the polymer A when all repeating units of the polymer A are taken to be 100.0 mass % is preferably 3.0 mass % or more, and more preferably 5.0 mass % or more, and is preferably 44.9 mass % or less, and more preferably 35.0 mass % or less. When the proportion in which other monomer units are included in the polymer A is not less than any of the lower limits set forth above, slurry stability of the adhesive composition for an electrical storage device can be further increased. Herein, the term "slurry stability" refers to dispersion stability of solid content in the adhesive composition and stability during application of the adhesive composition or the like. Moreover, when the proportion in which other monomer units are included in the polymer A is not more than any of the upper limits set forth above, low-temperature output characteristics of an electrical storage device including a functional layer containing the polymer A can be further enhanced.

Particularly in a case in which the polymer A includes an acidic group-containing monomer unit as another monomer unit, the proportion in which the acidic group-containing monomer unit is included in the polymer A when all repeating units of the polymer A are taken to be 100.0 mass % is preferably 1.5 mass % or more, and more preferably 2.5 mass % or more, and is preferably 8.0 mass % or less, and more preferably 6.0 mass % or less. When the proportion in which the acidic group-containing monomer unit is included in the polymer A is not less than any of the lower limits set forth above, slurry stability of the adhesive composition for an electrical storage device can be further increased. Moreover, when the proportion in which the acidic group-containing monomer unit is included in the polymer A is not more than any of the upper limits set forth above, importation of an excessively large amount of water due to the acidic group-containing monomer unit can be inhibited, and low-temperature output characteristics of an electrical storage device including a functional layer containing the polymer A can be further enhanced.

[Production Method of Polymer A]

The polymer A can be produced in accordance with any known polymerization method without any specific limitations. The polymerization method of the polymer A is not specifically limited and may, for example, be any of solution polymerization, suspension polymerization, bulk polymerization, and emulsion polymerization. Moreover, the polymerization reaction may be addition polymerization such as ionic polymerization, radical polymerization, or living radical polymerization. Furthermore, a known organic solvent, water, or the like can be used as a polymerization solvent without any specific limitations. Of such solvents, water is preferable as the polymerization solvent. Examples of polymerization initiators that can be used include, but are not specifically limited to, sodium persulfate, ammonium persulfate, and potassium persulfate. Of these polymerization initiators, ammonium persulfate is preferable. One of these may be used individually, or two or more of these may be used in combination in a freely selected ratio.

Various conditions such as the additive amount of polymerization initiator and the polymerization temperature can be set within typical ranges.

[Glass-Transition Temperature of Polymer A]

The glass-transition temperature of the polymer A is preferably −20° C. or higher, and more preferably 0° C. or higher, and is preferably 90° C. or lower, more preferably 46° C. or lower, and even more preferably 44° C. or lower. When the glass-transition temperature of the polymer A is not lower than any of the lower limits set forth above, low-temperature output characteristics of an electrical storage device including a functional layer containing the polymer A can be further improved. Moreover, when the glass-transition temperature of the polymer A is not higher than any of the upper limits set forth above, post-cycling adhesiveness of a functional layer containing the polymer A can be further increased.

Note that the glass-transition temperature of the polymer A can be raised by increasing the proportion of the nitrile group-containing monomer unit, for example, and can be lowered by reducing the proportion of the nitrile group-containing monomer unit or increasing the proportion of a (meth)acrylic acid ester monomer unit or the like corresponding to another monomer such as previously described, for example. Note that the glass-transition temperature of the polymer A can be measured by a measurement method described in the EXAMPLES section of the present specification.

[Volume-Average Particle Diameter of Polymer A]

The volume-average particle diameter of the polymer A is preferably 160 nm or more, and more preferably 200 nm or more, and is preferably 1,500 nm or less, more preferably 1,000 nm or less, and even more preferably 600 nm or less. Setting the volume-average particle diameter of the polymer A within any of the ranges set forth above can further increase post-cycling adhesiveness that can be displayed by a functional layer containing the polymer A. Note that the volume-average particle diameter of the polymer A can be controlled by adjusting the polymerization time and the amount of emulsifier used in production of the polymer A, for example.

<Polymer B>

The polymer B is a component that, in a functional layer, has a function of holding components contained in the functional layer, such as the polymer A. When the adhesive composition contains the polymer B, detachment of contained components from an obtained functional layer for an electrical storage device can be effectively inhibited. Note that the polymer B is a water-insoluble particulate polymer.

[Glass-Transition Temperature of Polymer B]

The glass-transition temperature of the polymer B is preferably 20° C. or lower, and more preferably 15° C. or lower, and is preferably −40° C. or higher, and more preferably −30° C. or higher. When the glass-transition temperature of the polymer B is not lower than any of the lower limits set forth above, adhesive strength that can be displayed by a functional layer containing the polymer B can be improved. Moreover, when the glass-transition temperature of the polymer B is not higher than any of the upper limits set forth above, the polymer B can act to favorably hold contained components in a functional layer and thus effectively inhibit detachment of contained components from the functional layer. Note that the glass-transition temperature of the polymer B can be measured by a measurement method described in the EXAMPLES section of the present specification.

[Chemical Composition of Polymer B]

The polymer B may have any chemical composition without any specific limitations so long as, for example, the glass-transition temperature of the polymer B is within any of the ranges set forth above. For example, the polymer B may be a thermoplastic elastomer. The thermoplastic elastomer is preferably a conjugated diene polymer or an acrylic polymer, and more preferably an acrylic polymer. The term "conjugated diene polymer" refers to a polymer that includes a conjugated diene monomer unit. Specific examples of conjugated diene polymers include, but are not specifically limited to, a copolymer including an aromatic vinyl monomer unit and an aliphatic conjugated diene monomer unit, such as a styrene-butadiene copolymer (SBR), butadiene rubber (BR), nitrile rubber (NBR) (copolymer including an acrylonitrile unit and a butadiene unit), and hydrogenated products thereof.

The term "acrylic polymer" refers to a polymer that includes a (meth)acrylic acid ester monomer unit as a main component. Examples of (meth)acrylic acid ester monomers that can form the (meth)acrylic acid ester monomer unit include the same (meth)acrylic acid alkyl ester monomers as can form other monomer units of the polymer A. One of such binders may be used individually, or two or more of such binders may be used in combination. When a polymer is said to have a specific monomer unit "as a main component" in the present specification, this means that when all repeating units included in the polymer are taken to be 100.0 mass %, the specific monomer unit is included in a proportion of more than 50.0 mass %.

Of these examples, an acrylic polymer is preferable as the polymer B.

In a case in which the polymer B is an acrylic polymer, other monomer units besides the (meth)acrylic acid alkyl ester monomer unit that are included in the acrylic polymer can, without any specific limitations, be formed using any of the same monomers as monomers that can form the nitrile group-containing monomer unit of the polymer A, any of the same monomers as monomers that can form the alicyclic (meth)acrylic acid ester monomer unit of the polymer A, and any of the same monomers as monomers that can form other monomer units of the polymer A. Note that in a case in which the polymer B includes a nitrile group-containing monomer unit, the proportion in which the nitrile group-containing monomer unit is included is preferably not less than 3.0 mass % and not more than 20.0 mass % when all repeating units of the polymer B are taken to be 100.0 mass %. Moreover, in a case in which the polymer B includes an alicyclic (meth)acrylic acid ester monomer unit, the proportion in which the alicyclic (meth)acrylic acid ester monomer unit is included is preferably not less than 3.0 mass % and not more than 30.0 mass %.

[Production Method of Polymer B]

The polymer B can be produced as appropriate based on known polymerization methods, polymerization solvents, polymerization initiators, polymerization conditions, and so forth without any specific limitations, in the same way as the polymer A.

[Volume-Average Particle Diameter of Polymer B]

The volume-average particle diameter of the polymer B is preferably smaller than that of the polymer A, more preferably 200 nm or less, and more preferably 160 nm or less, and is preferably 30 nm or more, and more preferably 60 nm or more. When the volume-average particle diameter of the polymer B is within any of the ranges set forth above, the polymer B can act to favorably hold contained components in a functional layer and thus effectively inhibit detachment of contained components from the functional layer, and post-cycling adhesiveness that can be displayed by the functional layer can be further increased.

Note that the volume-average particle diameter of the polymer B can be controlled by adjusting the polymerization time and the amount of emulsifier used in production of the polymer B, for example.

[Ratio of Volume-Average Particle Diameter of Polymer A/Volume-Average Particle Diameter of Polymer B (Times)]

A ratio of the volume-average particle diameter of the polymer A and the volume-average particle diameter of the polymer B is obtained by dividing the volume-average particle diameter of the polymer A by the volume-average particle diameter of the polymer B. The value of this ratio is preferably 1.2 or more, and more preferably 1.5 or more, and is preferably 10.0 or less, more preferably 6.0 or less, and even more preferably 2.40 or less. When the ratio of "volume-average particle diameter of polymer A/volume-average particle diameter of polymer B" (times) is within any of the ranges set forth above, post-cycling adhesiveness that can be displayed by a functional layer can be further increased.

<Amounts>

The amounts of the polymer A and the polymer B in the adhesive composition are not specifically limited to the extent that this does not interfere with achieving the objectives of the present disclosure. For example, a ratio of the amounts of the polymer A and the polymer B in the adhesive composition may be within a range of polymer A:polymer B=10:1 to 5:5, by mass.

<Other Components>

The presently disclosed adhesive composition may optionally contain dispersants, wetting agents, viscosity modifiers, additives for electrolyte solution, and other known additives such as disclosed in JP 2016-048670 A, for example. One of these other components may be used individually, or two or more of these other components may be used in combination.

<Solvent>

The solvent contained in the adhesive composition is not specifically limited and may be water or an organic solvent. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol. Of these solvents, water is preferable.

Note that one of these solvents may be used individually, or two or more of these solvents may be used as a mixture in a freely selected mixing ratio.

<Production Method of Adhesive Composition>

The method by which the adhesive composition is produced is not specifically limited and is normally a method in which the polymer A is mixed in the solvent with the polymer B and other components, which are optional components. A mixing method using a typically used stirrer or disperser may be adopted as the mixing method without any specific limitations. It should be noted that in a case in which the presently disclosed adhesive composition is compounded in a subsequently described composition for a functional layer and is used in this form, it is not essential that the presently disclosed adhesive composition is independently produced. In other words, the presently disclosed adhesive composition may be produced by adding and mixing functional particles together with the polymer A and optional components such as the polymer B and additives in production of a composition for a functional layer that contains the presently disclosed adhesive composition.

(Functional Layer for Electrical Storage Device)

The presently disclosed functional layer is a layer having a function such as giving and receiving electrons, reinforcing a component, or adhering components together inside an electrical storage device and may, for example, be an electrode mixed material layer that gives and receives electrons through electrochemical reactions, a porous membrane layer that improves heat resistance and strength, or an adhesive layer that improves adhesiveness. The presently disclosed functional layer may be a layer that is formed using the presently disclosed adhesive composition set forth above. More specifically, the presently disclosed functional layer may be a layer containing a cured product of the presently disclosed adhesive composition set forth above that is formed from the presently disclosed adhesive composition or may be a layer containing a cured product of a composition for a functional layer that contains the presently disclosed adhesive composition set forth above and functional particles that are particles that can be compounded in order to cause the functional layer to display a desired function. The presently disclosed functional layer can be formed by applying the presently disclosed adhesive composition set forth above or the presently disclosed composition for a functional layer onto the surface of a suitable substrate to form a coating film, and subsequently drying the coating film. In other words, the presently disclosed functional layer is formed by a dried product of the adhesive composition or the composition for a functional layer, and normally contains at least the polymer A. The presently disclosed functional layer preferably further contains the polymer B. Note that since components contained in the functional layer are components that were contained in the adhesive composition or the composition for a functional layer, the preferred ratio of these components is also the same as the preferred ratio of the components in the adhesive composition set forth above or the subsequently described composition for a functional layer. Moreover, in a case in which the polymer A, polymer B, organic particles, or the like that can be contained in the adhesive composition or the composition for a functional layer is a polymer including a cross-linkable functional group, the polymer may be cross-linked during drying of the adhesive composition or the composition for a functional layer, or may be cross-linked during heat treatment or the like that is optionally performed after drying (i.e., the functional layer may contain a cross-linked product of the polymer A, polymer B, organic particles, or the like).

An electrical storage device including a component that includes the presently disclosed functional layer can be caused to display excellent low-temperature output characteristics as a result of the presently disclosed functional layer being formed from the presently disclosed adhesive composition or a composition for a functional layer that contains the presently disclosed adhesive composition.

<Composition for Functional Layer>

The composition for a functional layer that can be used to form the presently disclosed functional layer may contain functional particles in addition to the presently disclosed adhesive composition. These functional particles may be non-conductive particles or electrode active material particles, for example. For example, non-conductive particles can be compounded as functional particles in a case in which the functional layer is a porous membrane layer or in a case in which the functional layer is an adhesive layer provided only for displaying adhesiveness but in which it is still necessary to increase the strength and heat resistance of the adhesive layer. Moreover, electrode active material particles can be compounded as functional particles in a case in which the functional layer is an electrode mixed material layer.

[Non-Conductive Particles]

Known non-conductive particles that can be used in electrical storage devices such as secondary batteries can be used without any specific limitations as non-conductive particles serving as functional particles. The inclusion of non-conductive particles as functional particles in the composition for a functional layer can impart mechanical strength and heat resistance to a functional layer that is formed from the composition for a functional layer.

More specifically, either or both of inorganic particles and organic particles can be used as non-conductive particles.

Examples of inorganic particles that can be used include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary. Compounding of inorganic particles as non-conductive particles can effectively increase the mechanical strength and heat resistance of the functional layer.

The organic particles may be organic particles that differ from the polymers A and B in terms of chemical composition and properties. Examples of organic particles that can be used include particles of various cross-linked polymers such as polyethylene, polystyrene, polydivinylbenzene, cross-linked styrene-divinylbenzene copolymer, polyimide, polyamide, polyamide-imide, melamine resin, phenolic resin, and benzoguanamine-formaldehyde condensate; and particles of heat resistant polymers such as polysulfone, polyacrylonitrile, polyaramid, polyacetal, and thermoplastic polyimide. The organic particles differ from the polymer A in terms that either they do not include an alicyclic (meth)acrylic acid ester monomer unit or, in a case in which they do include an alicyclic (meth)acrylic acid ester monomer unit, the proportion in which the alicyclic (meth)acrylic acid ester monomer unit is included is less than 50 mass % or is more than 90 mass % when all repeating units of the organic particles are taken to be 100 mass %. The glass-transition temperature of the organic particles may be higher than 20° C. Note that organic particles used as non-conductive particles are water-insoluble.

In a case in which the functional particles are non-conductive particles, the amount of the polymer A in the composition for a functional layer may, for example, be not less than 10 parts by mass and not more than 50 parts by mass when the amount of the non-conductive particles is taken to be 100 parts by mass.

[Electrode Active Material Particles]

Particles formed from known electrode active materials that can be used in electrical storage devices such as secondary batteries can be used without any specific limitations as electrode active material particles serving as functional particles. Specifically, particles formed from any of the electrode active materials described below can be used without any specific limitations as electrode active material particles that can be used in an electrode mixed material layer of a lithium ion secondary battery, which is one example of a secondary battery. Compounding of electrode active material particles as functional particles in the presently disclosed composition for a functional layer enables a functional layer that can be formed using the composition for a functional layer to function as an electrode mixed material layer.

Positive Electrode Active Material

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), lithium-containing complex oxide of Co—Ni—Mn, lithium-containing complex oxide of Ni—Mn—Al, lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

Negative Electrode Active Material

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal; simple substances of metals that can form lithium alloys (for example, Ag, Al, Ba, Bi, Cu, Ga, Ge, In, Ni, P, Pb, Sb, Si, Sn, Sr, Zn, and Ti); and oxides, sulfides, nitrides, silicides, carbides, and phosphides of any of the preceding examples. Moreover, an oxide such as lithium titanate can be used.

One of the negative electrode active materials described above may be used individually, or two or more of the negative electrode active materials described above may be used in combination.

In a case in which the functional particles are electrode active material particles, the amount of the polymer A in the composition for a functional layer may be not less than 1 part by mass and not more than 20 parts by mass when the amount of the electrode active material particles is taken to be 100 parts by mass, for example.

[Other Components]

The composition for a functional layer may optionally contain any of the same components as the other components that can optionally be contained in the presently disclosed adhesive composition, and may optionally contain known additives that can be added to various functional layers, such as conductive additives. One of these other components may be used individually, or two or more of these other components may be used in combination.

[Production Method of Composition for Functional Layer]

The method by which the composition for a functional layer is produced is not specifically limited and may be a method in which the presently disclosed adhesive composition and the functional particles are mixed in a solvent. Moreover, the composition for a functional layer containing the adhesive composition can be produced as previously described in the "Production method of adhesive composition" section by adding various components that can be contained in the presently disclosed adhesive composition and the functional particles to a solvent and performing mixing thereof. A typical mixing method such as previously described can be adopted as the mixing method.

<Substrate>

No limitations are placed on the substrate onto which the adhesive composition or the composition for a functional layer is applied. For example, a coating film may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a component of an electrical storage device.

However, it is preferable that a current collector, a separator substrate, or an electrode substrate is used as the substrate from a viewpoint of raising component production efficiency since a step of peeling the functional layer can be omitted. Specifically, in production of an electrode mixed material layer, it is preferable that the composition for a functional layer is applied onto a current collector serving as a substrate. Moreover, in production of a porous membrane layer or an adhesive layer, it is preferable that the adhesive composition or the composition for a functional layer is applied onto a separator substrate or an electrode substrate.

Current Collector

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

Separator Substrate

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

Electrode Substrate

The electrode substrate is not specifically limited and may be an electrode substrate obtained by forming an electrode mixed material layer containing electrode active material particles and a binder on a current collector such as previously described.

Any of the previously described electrode active material particles and known binders that can be used in production of an electrode for an electrical storage device can be used without any specific limitations as the electrode active material particles and the binder that are contained in the electrode mixed material layer of the electrode substrate.

<Formation Method of Functional Layer>

Examples of methods by which the functional layer may be formed on a substrate such as the current collector, the separator substrate, or the electrode substrate described above include:

(1) a method in which the presently disclosed adhesive composition or composition for a functional layer is applied onto the surface of the substrate (surface at the electrode mixed material layer side in the case of an electrode substrate; same applies below) and is then dried;

(2) a method in which the substrate is immersed in the presently disclosed adhesive composition or composition for a functional layer and is then dried; and (3) a method in which the presently disclosed adhesive composition or composition for a functional layer is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the adhesive composition or the composition for a functional layer onto a substrate (application step) and a step of drying the adhesive composition or the composition for a functional layer that has been applied onto the substrate to form a functional layer (drying step).

Application Step

Examples of methods by which the adhesive composition or the composition for a functional layer can be applied onto the substrate in the application step include, but are not specifically limited to, doctor blading, reverse roll coating, direct roll coating, gravure coating, extrusion coating, and brush coating.

Drying Step

The method by which the adhesive composition or the composition for a functional layer on the substrate is dried in the drying step is not specifically limited and may be a commonly known method. Examples of drying methods that can be used include drying by warm, hot, or low-humidity air, drying in a vacuum, and drying through irradiation with infrared light, electron beams, or the like. The drying temperature is preferably lower than 200° C., and more preferably lower than 150° C.

(Component Including Functional Layer)

A component (separator or electrode) including the presently disclosed functional layer may include constituent elements other than the presently disclosed functional layer set forth above and a substrate so long as the effects disclosed herein are not significantly lost. Examples of such constituent elements include, but are not specifically limited to, electrode mixed material layers, porous membrane layers, and adhesive layers that do not correspond to the presently disclosed functional layer.

Moreover, the component may include more than one type of the presently disclosed functional layer. In one example, an electrode may include an electrode mixed material layer formed on a current collector from the composition for a functional layer set forth above and may also include, on the electrode mixed material layer, a porous membrane layer formed from the composition for a functional layer set forth above and/or an adhesive layer formed from the composition for a functional layer or the presently disclosed adhesive composition set forth above. In another example, a separator may include a porous membrane layer formed on a separator substrate from the presently disclosed composition for a functional layer and may also include, on the porous membrane layer, an adhesive layer formed from the composition for a functional layer or the presently disclosed adhesive composition set forth above.

The component including the presently disclosed functional layer can adhere well to an adjacent component and can cause an electrical storage device to display excellent low-temperature output characteristics.

(Electrical Storage Device)

The presently disclosed electrical storage device includes the presently disclosed functional layer set forth above. The presently disclosed electrical storage device includes two types of electrodes (hereinafter, respectively referred to as "electrode A" and "electrode B") and a separator, wherein the functional layer for an electrical storage device set forth above is included by at least one of the electrode A, the electrode B, and the separator or can form an adhesive layer between these components and a casing of the electrical storage device. Note that the "electrode A" is, for example, a "positive electrode" in a case in which the electrical storage device is a battery or a secondary battery and is an "anode" in a case in which the electrical storage device is a capacitor. Moreover, the "electrode B" is, for example, a "negative electrode" in a case in which the electrical storage device is a battery or a secondary battery and is a "cathode" in a case in which the electrical storage device is a capacitor. Of these examples, a case in which the separator includes the presently disclosed functional layer for an electrical storage device is preferable. In this case, a functional layer-equipped separator and at least one of the two types of electrodes can be adhered via the presently disclosed functional layer for an electrical storage device. Moreover, the presently disclosed electrical storage device can display excellent low-temperature output characteristics.

<Electrode A, Electrode B, and Separator>

At least one of the electrode A, the electrode B, and the separator is a battery component that includes the presently disclosed functional layer set forth above. Note that a known electrode or separator can be used in the electrical storage device without any specific limitations as an electrode A, electrode B, or separator that does not include the presently disclosed functional layer.

<Electrolyte Solution>

The electrolyte solution is normally an organic electrolyte solution obtained by dissolving a supporting electrolyte in an organic solvent. For example, the supporting electrolyte may be a lithium salt in the case of a lithium ion secondary battery or a lithium ion capacitor. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein.

Examples of suitable organic solvents in the case of a lithium ion secondary battery or a lithium ion capacitor include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrical Storage Device>

A feature of the presently disclosed method of producing an electrical storage device is that it includes: a stacking step of stacking two or more components among a plurality of components included in an electrical storage device, via the presently disclosed functional layer for an electrical storage device, to obtain a stack; and a pressing step of pressing the stack to adhere the two or more components to one another. The presently disclosed method of producing an electrical storage device preferably further includes a step of providing the functional layer for an electrical storage device on at least one side of a separator to form a functional layer-equipped separator at an earlier stage than the stacking step. The presently disclosed method of producing an electrical storage device enables adhesion, via the presently disclosed functional layer for an electrical storage device, of two or more components among a plurality of components of an electrical storage device, and thus enables good production of the presently disclosed electrical storage device having excellent low-temperature output characteristics.

[Functional Layer-Equipped Separator Formation Step]

In this step, a functional layer formed using the presently disclosed adhesive composition or composition for a functional layer is provided on a separator substrate. Any of the various methods described in the "Formation method of functional layer" section of the "Functional layer for electrical storage device" section can be adopted without any specific limitations as the method by which the functional layer is provided.

[Stacking Step]

In the stacking step, a plurality of components of an electrical storage device, such as the previously described electrode A, electrode B, and separator, for example, are stacked via the functional layer for an electrical storage device to obtain a stack. For example, in a case in which a functional layer-equipped separator obtained by the previously described step is used, the functional layer and an electrode mixed material layer-side surface of at least one of an electrode substrate of the electrode A and an electrode substrate of the electrode B are stacked such as to face one another. In this case, the functional layer-equipped separator and at least one of the electrode A and the electrode B are adhered via the functional layer. Note that the stack may be subjected to an operation such as "winding" or "folding" as necessary.

[Pressing Step]

In the pressing step, the stack obtained in the previously described step is pressed to adhere the two or more components to one another. The pressure during pressing may be not less than 0.1 MPa and not more than 10.0 MPa, for example. The stack obtained through the pressing step, which includes stacked components adhered to one another, may be enclosed in any packing such as a battery container. An electrical storage device can then be produced by injecting electrolyte solution inside of the packing in which the stack is enclosed and sealing the packing. In order to prevent pressure increase inside the electrical storage device and the occurrence of overcharging or overdischarging, an expanded metal, an overcurrent preventing device such as a fuse or a PTC device, a lead plate, or the like may be placed inside the battery container or other packing as necessary. The shape of the electrical storage device may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a repeating unit (monomer unit) that is formed through polymerization of a given monomer is normally, unless otherwise specified, the same as the ratio (charging ratio) of the given monomer among all monomers used in polymerization of the polymer.

In the examples and comparative examples, the following methods were used to measure or evaluate the glass-transition temperature and volume-average particle diameter of a polymer A and a polymer B, the post-cycling adhesiveness of a functional layer, and the low-temperature output characteristics of an electrical storage device including the functional layer.

<Glass-Transition Temperature of Polymer A and Polymer B>

A polymer A or polymer B produced or prepared in each example or comparative example was used as a measurement sample to measure a DSC curve in accordance with JIS K7121 using a differential scanning calorimeter (EXSTAR DSC6220 produced by SII NanoTechnology Inc.). Specifically, 10 mg of the dried measurement sample was weighed into an aluminum pan and then a DSC curve was measured in a measurement temperature range of −100° C. to 200° C. with a heating rate of 20° C./min and using an empty aluminum pan as a reference. In the heating process, the glass-transition temperature of the polymer A or polymer B was determined from a point of intersection of a baseline directly before a heat absorption peak on the DSC curve at which a derivative signal (DDSC) reached 0.05 mW/min/mg or more and a tangent to the DSC curve at a first inflection point to appear after the heat absorption peak.

<Volume-Average Particle Diameter of Polymer A and Polymer B>

A polymer A or polymer B prepared or produced in each example or comparative example was used to produce a water dispersion having a solid content concentration of 0.1 mass %, and then a particle diameter distribution (volume basis) of the polymer A or polymer B in the water dispersion was measured using a laser diffraction particle size distribution analyzer (SALD-7100 produced by Shimadzu Corporation). In the measured particle diameter distribution, the particle diameter at which cumulative volume calculated from the small diameter end of the distribution reached 50% was taken to be the volume-average particle diameter (D50).

<Post-Cycling Adhesiveness>

A double-sided negative electrode, a functional layer-equipped separator (double-sided), and a single-sided positive electrode produced in each example or comparative example were used to produce a lithium ion secondary battery for evaluation of post-cycling adhesiveness (hereinafter, also referred to as a "secondary battery for post-cycling adhesiveness evaluation") as described below. In this production, a functional layer-equipped separator (double-sided) and a single-sided positive electrode were first stacked in this order at each side (negative electrode mixed material layer) of the double-sided negative electrode to obtain a stack X. The obtained stack X was then used to produce a secondary battery for post-cycling adhesiveness evaluation by enclosing the stack X in an aluminum packing case and injecting electrolyte solution in the same way as in the examples and comparative examples. The produced secondary battery for post-cycling adhesiveness evaluation was left at rest in a 25° C. environment for 24 hours and was then subjected to 4 cycles of a charge/discharge operation of charging to 4.35 V at a charge rate of 0.1 C and discharging to 2.75 V at a discharge rate of 0.1 C in a 25° C. environment. Thereafter, the same charge/discharge operation was performed repeatedly in a 60° C. environment. The battery after 1,000 cycles of discharging was used to evaluate adhesive strength based on adherability of a negative electrode mixed material layer to a functional layer after cycling.

In this evaluation, the secondary battery for post-cycling adhesiveness evaluation obtained after the cycling test was first dismantled in an inert gas atmosphere to remove the stack X, and electrolyte solution attached to the surface of the stack X was wiped off. Next, at one end of the stack X, the functional layer-equipped separator, inclusive of the single-sided positive electrode, and the double-sided negative electrode were peeled apart for roughly 1 cm. Thereafter, the separator end included in the peeled part and the end of a separator positioned at the opposite side with the double-sided negative electrode interposed in-between were each held, one of the separators was pulled leftward and the other of the separators was pulled rightward at a pulling speed of 25 mm/min, and the functional layer-equipped separators were peeled from both sides of the negative electrode over the entire surface thereat. The adhered area fraction of the negative electrode mixed material layer to the functional layer (i.e., on the separator) was inspected by eye, and adhesive strength was evaluated by the following standard. A higher adhered area fraction of negative electrode mixed material layer to functional layer indicates that higher adhesive strength can be displayed by the functional layer after repeated charging and discharging. Note that two secondary batteries for post-cycling adhesiveness evaluation were prepared, and thus the adhered area fraction of negative electrode mixed material layer to functional layer was evaluated for 4 sides in total.

A: 90% or more
B: Not less than 30% and less than 90%
C: Less than 30%

<Low-Temperature Output Characteristics>

A lithium ion secondary battery produced in each example or comparative example was left at rest for 24 hours in a 25° C. environment. Thereafter, the lithium ion secondary battery was charged to a cell voltage of 3.65 V by a 0.2 C constant-current method in a 25° C. environment, was then subjected to 12 hours of aging at a temperature of 60° C., and was subsequently discharged to a cell voltage of 3.00 V by a 0.2 C constant-current method. The lithium ion secondary battery was then CC-CV charged (upper limit cell voltage 4.2 V) by a 0.1 C constant-current method and was CC discharged to a cell voltage of 3.00 V by a 0.1 C constant-current method in a 60° C. environment. This charging and discharging at 0.1 C was repeated three times. An operation of charging for 5 hours at a charge rate of 0.1 C was then performed and the voltage V0a at this point was measured. Thereafter, an operation of discharging at a discharge rate of 1 C was performed in a −15° C. environment and the voltage V1a at 15 seconds after the start of discharging was measured. The voltage change ΔVa was taken to be V0a-V1a.

The lithium ion secondary battery was subsequently subjected to 1,000 cycles of a charge/discharge operation between cell voltages of 4.20 V and 3.00 V at a charge/ discharge rate of 0.1 C in a 60° C. environment. After the lithium ion secondary battery had been allowed to cool to 25° C., an operation of charging for 5 hours at a charge rate of 0.1 C was performed in a 25° C. environment and the voltage V0$b$ at this point was measured. V0$b$ was confirmed to be 80% or more of V0$a$. Thereafter, an operation of discharging at a discharge rate of 1 C was performed in a −15° C. environment and the voltage V1$b$ at 15 seconds after the start of discharging was measured. The voltage change ΔVb was taken to be V0$b$-V1$b$. A ratio of voltage changes (ΔVb/ΔVa) was calculated and was evaluated by the following standard. A larger ratio of voltage changes (ΔVb/ΔVa) indicates that the secondary battery has better post-cycling low-temperature output characteristics.

A: Ratio of voltage changes of 0.9 or more

B: Ratio of voltage changes of not less than 0.8 and less than 0.9

C: Ratio of voltage changes of less than 0.8

Example 1

<Production of Polymer A>

A reactor including a stirrer was charged with 100 parts of deionized water and 0.5 parts of ammonium persulfate as a polymerization initiator, the gas phase was purged with nitrogen gas, and the temperature was raised to 60° C. Meanwhile, a monomer mixture of 50 parts of deionized water, 0.3 parts of sodium dodecylbenzenesulfonate as an emulsifier, 70 parts of cyclohexyl acrylate (CHA) as an alicyclic (meth)acrylic acid ester monomer, 5 parts of acrylonitrile (AN) as a nitrile group-containing monomer, and, as other monomers, 20 parts of 2-ethylhexyl acrylate (2EHA) as a (meth)acrylic acid alkyl ester monomer, and 4 parts of methacrylic acid (MAA) and 1 part of acrylic acid (AA) as acidic group-containing monomers was obtained in a separate vessel. The monomer mixture was continuously added to the reactor over 4 hours to perform polymerization at 60° C. Polymerization was continued until the polymerization conversion rate reached 96% to yield a water dispersion containing a particulate polymer. The reaction was terminated by cooling at the point at which the polymerization conversion rate reached 99% to produce a water dispersion containing a polymer A. The glass-transition temperature and the volume-average particle diameter of the obtained polymer A were measured as previously described. The results are shown in Table 1.

<Production of Polymer B>

A polymer B that was an acrylic polymer was produced as described below.

A reactor including a stirrer was charged with 70 parts of deionized water, 0.15 parts of polyoxyethylene lauryl ether (EMULGEN® 120 (EMULGEN is a registered trademark in Japan, other countries, or both) produced by Kao Corporation) as an emulsifier, and 0.5 parts of ammonium persulfate, the gas phase was purged with nitrogen gas, and the temperature was raised to 60° C.

A reactor including a stirrer was charged with 70 parts of deionized water, 0.15 parts of polyoxyethylene lauryl ether (EMULGEN® 120 produced by Kao Corporation) as an emulsifier, and 0.5 parts of ammonium persulfate, the gas phase was purged with nitrogen gas, and the temperature was raised to 60° C.

Meanwhile, a monomer composition was obtained in a separate vessel by mixing 50 parts of deionized water, 0.5 parts of polyoxyethylene lauryl ether (EMULGEN® 120 produced by Kao Corporation) as an emulsifier, 12 parts of cyclohexyl methacrylate (alicyclic (meth)acrylic acid ester monomer), 13 parts of methyl methacrylate and 60 parts of 2-ethylhexyl acrylate ((meth)acrylic acid alkyl ester monomers), 10 parts of acrylonitrile (nitrile group-containing monomer), 1 part of ethylene glycol dimethacrylate (EDMA) (cross-linkable monomer), and 4 parts of acrylic acid (AA) (acidic group-containing monomer). The monomer composition was continuously added to the reactor over 4 hours to perform polymerization. The reaction was carried out at 70° C. during the addition. Once the addition was completed, stirring was carried out for a further 3 hours at 80° C. to complete the reaction and yield a water dispersion containing a polymer B. The glass-transition temperature and the volume-average particle diameter of the obtained polymer B were measured as previously described. The results are shown in Table 1.

<Preparation of Additives>

«Production of Water-Soluble Polymer»

A 1 L flask made from glass was charged with 710 g of deionized water. The deionized water was heated to a temperature of 40° C. and the inside of the flask was purged with nitrogen gas at a flow rate of 100 mL/min. Next, 0.1 g (solid content) of ethylene glycol dimethacrylate (cross-linkable monomer), 89.9 g (solid content) of acrylamide ((meth)acrylamide monomer), and 10.0 g (solid content) of acrylic acid (acid group-containing monomer) were mixed and were injected into the flask using a syringe. Thereafter, 8.0 g of a 2.5% aqueous solution of potassium persulfate was added into the flask by a syringe as a polymerization initiator at the start of reaction. In addition, 20 g of a 2.0% aqueous solution of tetramethylethylenediamine was added by a syringe 15 minutes later as a polymerization aid to initiate a reaction. Once 4 hours had passed from addition of the initiator, 4.0 g of a 2.5% aqueous solution of potassium persulfate was added as a polymerization initiator, 10 g of a 2.0% aqueous solution of tetramethylethylenediamine was further added as a polymerization aid, the temperature was raised to 60° C., and the polymerization reaction was allowed to proceed. Three hours later, the flask was opened to air to terminate the polymerization reaction, and the product was deodorized at a temperature of 80° C. to remove residual monomer. The pH of the product was subsequently adjusted to 8 using a 5% aqueous solution of sodium hydroxide to obtain a water-soluble polymer as a viscosity modifier.

«Production of Dispersant»

A monomer composition was obtained by mixing 50 parts of water, 80 parts of acrylic acid, 19.92 parts of acrylamido-2-methylpropane sulfonic acid, and 0.08 parts of 2-(N-acryloyl)amino-2-methyl-1,3-propane disulfonic acid. A four-necked flask including a thermometer, a stirrer, and a reflux condenser was charged with 150 parts of water, and then the water was heated to 80° C. The monomer composition and 10 parts of 30% sodium persulfate aqueous solution were each continuously drip fed into the flask under stirring over 3 hours using a metering pump to perform a polymerization reaction at 80° C. Once this dripping was completed, the system was maintained at 80° C. to perform 1 hour of aging and complete the polymerization reaction. Thereafter, 120 parts of 32% sodium hydroxide aqueous solution was added into the flask to completely neutralize the reaction liquid and obtain an aqueous solution of a polycarboxylic acid sulfonic acid copolymer as a dispersant. The polymer had a weight-average molecular weight of 11,000 and a degree of swelling in electrolyte solution of 1.5 times.

<Production of Composition for Functional Layer>

Deionized water was added to 100 parts of alumina particles (volume-average particle diameter: 0.50 μm) as inorganic particles serving as functional particles and 1.0 parts of the polycarboxylic acid sulfonic acid copolymer obtained as a dispersant as described above such that the solid content concentration was 55 mass %, and then dispersing treatment was performed by a wet-type dispersing device (product name: LMZ-015; producer name: Ashizawa Finetech Ltd.) using beads of 0.4 mm in diameter under conditions of a circumferential speed of 6 m/s and a flow rate of 0.3 L/min to disperse the alumina particles. Next, 2 parts by mass in terms of solid content of the water-soluble polymer obtained as a viscosity modifier as described above was added relative to 100 parts by mass of the inorganic particles and was mixed therewith. Thereafter, a water dispersion containing 20 parts in terms of solid content of the previously described polymer A, a water dispersion containing 5 parts in terms of solid content of the polymer B, and 0.3 parts by mass of a polymer (weight-average molecular weight: 8,000; degree of swelling in electrolyte solution: 2.2 times) having an ethylene oxide-propylene oxide polymerization ratio of 50:50 (molar ratio) as a nonionic surfactant serving as a wetting agent were added, and deionized water was mixed so as to adjust the solid content concentration to 50 mass % and yield a composition for a functional layer containing the presently disclosed adhesive composition.

<Formation of Functional Layer and Functional Layer-Equipped Separator>

A separator made from a single layer of polypropylene was prepared as a separator substrate. The composition for a functional layer obtained as described above was applied onto both sides of the prepared substrate and was dried at 60° C. for 10 minutes. This yielded a separator (double-sided separator) including a functional layer (thickness: 1 μm) at both sides.

<Formation of Negative Electrode>

Deionized water, 100 parts of artificial graphite (average particle diameter: 15.6 μm) as a negative electrode active material, and 1 part in terms of solid content of a 2% aqueous solution of a sodium salt of carboxymethyl cellulose (MAC350HC produced by Nippon Paper Industries Co., Ltd.) as a water-soluble polymer were mixed in a planetary mixer equipped with a disper blade, were adjusted to a solid content concentration of 68%, and were then mixed at 25° C. for 60 minutes. The solid content concentration was further adjusted to 62% with deionized water and then a further 15 minutes of mixing was performed at 25° C. Deionized water and 2 parts (in terms of SBR solid content) of a solution of a styrene-butadiene copolymer (SBR; BM-400B produced by ZEON CORPORATION) having a solid content concentration of 40% were added to the resultant mixture, the final solid content concentration was adjusted to 42%, and a further 10 minutes of mixing was performed to yield a dispersion liquid. The obtained dispersion liquid was subjected to a defoaming process under reduced pressure to obtain a slurry composition for a negative electrode mixed material layer.

Next, the obtained slurry composition for a negative electrode mixed material layer was applied onto copper foil (thickness: 20 μm) serving as a current collector using a comma coater. The copper foil having the slurry composition for a negative electrode mixed material layer applied thereon was conveyed inside an oven at a temperature of 60° C. and a speed of 0.5 m/min for 2 minutes and was then conveyed inside an oven at a temperature of 120° C. for 2 minutes to perform heat treatment and thereby obtain a pre-roll pressing negative electrode web.

The obtained negative electrode web was rolled by roll pressing to produce a negative electrode (single-sided negative electrode) having a negative electrode mixed material layer thickness of 80 μm.

In addition, in production of a pre-pressing negative electrode web described above, application, drying, etc. of the slurry composition were performed with respect to both sides of a current collector. The obtained negative electrode web was rolled using a roll press to obtain a negative electrode (double-sided negative electrode) having a negative electrode mixed material layer thickness of 80 μm.

<Formation of Positive Electrode>

Mixing of 100 parts of $LiCoO_2$ having a volume-average particle diameter of 12 μm as a positive electrode active material, 1.2 parts of carbon nanotubes (BET specific surface area: 150 $m^2$/g) as a conductive material, 2 parts in terms of solid content of polyvinylidene fluoride (produced by Kureha Corporation; product name: #7208) as a binder for a positive electrode, and N-methylpyrrolidone as a solvent was performed such that the total solid content concentration was 70%. These materials were mixed using a planetary mixer to obtain a slurry composition for a positive electrode mixed material layer.

A comma coater was used to apply the obtained slurry composition for a positive electrode mixed material layer onto aluminum foil of 20 μm in thickness serving as a current collector such as to have a thickness of approximately 150 μm after drying. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press to obtain a positive electrode (single-sided positive electrode) having a positive electrode mixed material layer thickness of 80 μm.

In addition, in production of a pre-pressing positive electrode web described above, application, drying, etc. of the slurry composition were performed with respect to both sides of aluminum foil. The obtained positive electrode web was rolled by a roll press to obtain a positive electrode (double-sided positive electrode) having a positive electrode mixed material layer thickness of 80 μm.

<Production of Lithium Ion Secondary Battery>

A single-sided positive electrode obtained as described above was cut out as 5 cm×15 cm. A double-sided separator that had been cut out as 6 cm×16 cm was arranged on the single-sided positive electrode (mixed material layer side) such that one of the functional layers of the separator faced toward the single-sided positive electrode. A double-sided negative electrode that had been cut out as 5.5 cm×15.5 cm was arranged at a side corresponding to the other functional layer of the double-sided separator to obtain a stack A. A double-sided separator that had been cut out as 6 cm×16 cm was arranged at the double-sided negative electrode side of the stack A such that one of the functional layers of the separator faced toward the double-sided negative electrode of the stack A. In addition, a double-sided positive electrode that had been cut out as 5 cm×15 cm was overlapped at a side corresponding to the other functional layer of the double-sided separator. Next, a double-sided separator that had been cut out as 6 cm×16 cm was arranged on the double-sided positive electrode such that one of the functional layers of the separator faced toward the double-sided positive electrode. Finally, a single-sided negative electrode that had been cut out as 5.5 cm×15.5 cm was stacked on the other functional layer of the double-sided separator such that the negative electrode mixed material layer faced toward the functional layer of the double-sided separator to obtain a stack B. The stack B was enclosed in an aluminum packing case serving as a battery case, and electrolyte solution (solution obtained by dissolving $LiPF_6$ with a concentration of 1 mol/L as a supporting electrolyte in a mixed solvent of EC, DEC, and VC (EC/DEC/VC (volume ratio at 25° C.)=68.5/30/1.5)) was injected such that no air remained. The aluminum packing case was closed by heat sealing at 150° C. and then the obtained battery casing was flat plate pressed at 100° C. and 100 $kgf/cm^2$ (≈9.8 MPa) for 2 minutes to produce a stack-type lithium ion secondary battery as a 1,000 mAh electrical storage device.

Post-cycling adhesiveness and low-temperature output characteristics were evaluated with respect to the obtained lithium ion secondary battery by the previously described methods. The results are shown in Table 1.

Examples 2 to 6

The same steps as in Example 1 were implemented with the exception that in production of the polymer A, the amounts of used monomers were changed as shown in Table 1 and the amount of emulsifier was appropriately changed as necessary such that the volume-average particle diameter was as shown in Table 1. Various measurements and evaluations were also performed in the same way as in Example 1. The results are shown in Table 1.

Example 7

The amounts of used monomers were changed as shown in Table 1 in production of the polymer A. Moreover, a styrene-butadiene copolymer (BM-400B produced by ZEON CORPORATION) was used as a polymer B. With the exception of these points, the same steps as in Example 1 were implemented. Various measurements and evaluations were also performed in the same way as in Example 1. The results are shown in Table 1.

Example 8

A functional layer-equipped separator (double-sided) and a negative electrode formed in the same way as in Example 1 and a positive electrode formed as described below were used. Production of a lithium ion secondary battery as an electrical storage device, etc., and various measurements and evaluations were also performed in the same way as in Example 1. The results are shown in Table 1.
<Formation of Positive Electrode>

A planetary mixer equipped with a disper blade was charged with 100 parts of olivine-type lithium iron phosphate ($LiFePO_4$; produced by Formosa; product name: SFCM; volume-average particle diameter: 5 μm) as a positive electrode active material, 4.0 parts of acetylene black (produced by Denka Company Limited; product name: DENKA BLACK HS-100; volume-average particle diameter: 35 μm) and 1.0 parts of multi-walled carbon nanotubes (produced by CNano; product name: FloTube 9110; average fiber diameter: 10 nm; average fiber length: 10 μm; specific surface area: 200 $m^2/g$) as conductive materials, 1.0 parts in terms of solid content of carboxymethyl cellulose (produced by Daicel Corporation; product name: Daicel 2200; degree of etherification: 0.8 to 1.0) as a water-soluble polymer, and an appropriate amount of water, and was used to mix these materials at a temperature of 25° C. for 60 minutes.

The resultant mixture was mixed for 30 minutes by a Homo Mixer. Thereafter, 4.0 parts in terms of solid content of polymer A produced in the same way as in Example 1, 0.7 parts in terms of solid content of polyglycerin (produced by Sakamoto Yakuhin Kogyo Co., Ltd.; product name: Polyglycerin #500; weight-average molecular weight: 500) as a polyhydric alcohol polycondensate, and an appropriate amount of water were added, the solid content concentration was adjusted to 58%, and then 20 minutes of mixing was performed to yield a dispersion liquid. The obtained dispersion liquid was subjected to a defoaming process under reduced pressure to obtain a slurry composition for a positive electrode mixed material layer.

The obtained slurry composition for a positive electrode mixed material layer was applied onto aluminum foil (thickness: 20 μm) serving as a current collector using a comma coater such that the positive electrode mixed material layer thickness after drying was approximately 70 μm. Next, the aluminum foil having the slurry composition for a lithium ion secondary battery positive electrode applied thereon was conveyed inside an oven at a temperature of 60° C. and a speed of 0.5 m/min for 2 minutes and inside an oven at a temperature of 120° C. for 2 minutes to perform heat treatment and thereby obtain a positive electrode including a positive electrode mixed material layer. The obtained positive electrode web was rolled by a roll press to obtain a positive electrode having a positive electrode mixed material layer thickness of 80 μm.

Comparative Examples 1 to 3

In each of Comparative Examples 1 to 3, a polymer A' that did not satisfy the prescribed chemical composition was produced instead of the polymer A. In this production, the polymer A' was obtained through the same operations as in Example 1 with the exception that the amounts of used monomers were changed as shown in Table 1 and the amount of emulsifier was appropriately changed as necessary such that the volume-average particle diameter was as shown in Table 1. With the exception of these points, the same steps as in Example 1 were implemented. Various measurements and evaluations were also performed in the same way as in Example 1. The results are shown in Table 1.

In Table 1, shown below:

"CHA" indicates cyclohexyl acrylate;

"CHMA" indicates cyclohexyl methacrylate;

"MTDY" indicates tricyclo[$5,2,1,0^{2,6}$]decan-8-yl methacrylate;

"AN" indicates acrylonitrile;

"MAA" indicates methacrylic acid;

"AA" indicates acrylic acid;

"2EHA" indicates 2-ethylhexyl acrylate;

"MMA" indicates methyl methacrylate;

"βHEA" indicates hydroxyethyl acrylate;

"AM" indicates acrylamide;

"EDMA" indicates ethylene glycol dimethacrylate; and

"SBR" indicates styrene-butadiene copolymer.

TABLE 1

|  |  |  |  | Examples | | | | | |
| --- | --- | --- | --- | --- | --- | --- | --- | --- | --- |
|  |  |  |  | 1 | 2 | 3 | 4 | 5 | 6 |
| Adhesive composition | Polymer A (polymer A') |  | Type | Polymer A | Polymer A | Polymer A | Polymer A | Polymer A | Polymer A |
|  |  | Alicyclic (meth)acrylic acid ester monomer unit (mass %) | Type CHA | 70 | 83 | — | — | — | 58 |
|  |  |  | CHMA | — | — | 60 | — | 53 | — |
|  |  |  | MTDY | — | — | — | 55 | — | — |
|  |  |  | No. of carbon atoms (atoms) | 6 | 6 | 6 | 10 | 6 | 6 |
|  |  | Nitrile group-containing monomer unit (mass %) | AN | 5 | 5 | 15 | 10 | 30 | 35 |
|  |  | Other monomer units (mass %) | MAA | 4 | 3 | 4 | 5 | 2 | 3 |
|  |  |  | AA | 1 | 2 | 1 | — | 3 | 2 |
|  |  |  | 2EHA | 20 | 7 | 19.5 | 29.5 | 11 | 2 |
|  |  |  | MMA | — | — | — | — | — | — |
|  |  |  | βHEA | — | — | — | — | — | — |
|  |  |  | AM | — | — | — | — | — | — |
|  |  |  | EDMA | — | — | 0.5 | 0.5 | 1 | — |
|  |  | Glass-transition temperature (° C.) |  | 5 | 18 | 43 | 45 | 59 | 85 |
|  |  | Volume-average particle diameter (nm) |  | 250 | 210 | 310 | 320 | 700 | 480 |
|  |  | Amount (parts) |  | 20 | 20 | 20 | 20 | 20 | 20 |
|  | Polymer B | Type |  | Acrylic | Acrylic | Acrylic | Acrylic | Acrylic | Acrylic |
|  |  | Glass-transition temperature (° C.) |  | −20 | −20 | −20 | −20 | −20 | −20 |
|  |  | Volume-average particle diameter (nm) |  | 130 | 130 | 130 | 130 | 130 | 130 |
|  |  | Amount (parts) |  | 5 | 5 | 5 | 5 | 5 | 5 |
|  |  | Particle diameter ratio A/B (times) |  | 1.92 | 1.62 | 2.38 | 2.46 | 5.38 | 3.69 |
| Functional particles |  | Inorganic particles (parts) |  | 100 | 100 | 100 | 100 | 100 | 100 |
|  |  | Positive electrode active material (parts) |  | — | — | — | — | — | — |
|  | Functional layer formation location |  |  | Separator | Separator | Separator | Separator | Separator | Separator |
| Evaluation | Post-cycling adhesiveness |  |  | A | A | A | B | B | B |
|  | Low-temperature output characteristics |  |  | A | B | A | A | A | B |

|  |  |  |  | Examples | | Comparative examples | | |
| --- | --- | --- | --- | --- | --- | --- | --- | --- |
|  |  |  |  | 7 | 8 | 1 | 2 | 3 |
| Adhesive composition | Polymer A (polymer A') |  | Type | Polymer A | Polymer A | Polymer A' | Polymer A' | Polymer A' |
|  |  | Alicyclic (meth)acrylic acid ester monomer unit (mass %) | Type CHA | — | 70 | 40 | — | 95 |
|  |  |  | CHMA | 60 | — | — | 70 | — |
|  |  |  | MTDY | — | — | — | — | — |
|  |  |  | No. of carbon atoms (atoms) | 6 | 6 | 6 | 6 | 6 |
|  |  | Nitrile group-containing monomer unit (mass %) | AN | 15 | 5 | 2 | — | — |
|  |  | Other monomer units (mass %) | MAA | 4 | 4 | 1 | 1 | 3 |
|  |  |  | AA | 1 | 1 | — | 1 | 2 |
|  |  |  | 2EHA | 19.5 | 20 | 57 | — | — |
|  |  |  | MMA | — | — | — | 18 | — |
|  |  |  | βHEA | — | — | — | 2 | — |
|  |  |  | AM | — | — | — | 5 | — |
|  |  |  | EDMA | 0.5 | — | — | 3 | — |
|  |  | Glass-transition temperature (° C.) |  | 43 | 5 | −16 | 85 | 20 |
|  |  | Volume-average particle diameter (nm) |  | 310 | 250 | 240 | 190 | 180 |
|  |  | Amount (parts) |  | 20 | 4 | 20 | 20 | 20 |
|  | Polymer B | Type |  | SBR | — | Acrylic | Acrylic | Acrylic |
|  |  | Glass-transition temperature (° C.) |  | 5 | — | −20 | −20 | −20 |
|  |  | Volume-average particle diameter (nm) |  | 155 | — | 130 | 130 | 130 |
|  |  | Amount (parts) |  | 5 | — | 5 | 5 | 5 |
|  |  | Particle diameter ratio A/B (times) |  | 2.00 | — | 1.85 | 1.46 | 1.38 |
| Functional particles |  | Inorganic particles (parts) |  | 100 | — | 100 | 100 | 100 |
|  |  | Positive electrode active material (parts) |  | — | 100 | — | — | — |
|  | Functional layer formation location |  |  | Separator | Positive electrode | Separator | Separator | Separator |
| Evaluation | Post-cycling adhesiveness |  |  | A | A | C | C | C |
|  | Low-temperature output characteristics |  |  | A | A | B | C | C |

It can be seen from Table 1 that in Examples 1 to 8 in which the used composition for a functional layer contained an adhesive composition containing a polymer A including an alicyclic (meth)acrylic acid ester monomer unit in a proportion of not less than 50.0 mass % and not more than 90.0 mass % and also including a nitrile group-containing monomer unit, it was possible to form a functional layer that had high post-cycling adhesiveness and could improve low-temperature output characteristics of an electrical storage device. It can also be seen from Table 1 that in Comparative Examples 1 to 3 in which the used composition for a functional layer contained an adhesive composition containing a polymer A' that did not satisfy the prescribed chemical composition, it was not possible to form a functional layer having excellent post-cycling adhesiveness and it was not possible to improve low-temperature output characteristics of an electrical storage device.

INDUSTRIAL APPLICABILITY

According to the present disclosure, it is possible to provide an adhesive composition for an electrical storage device capable of forming a functional layer that has excellent post-cycling adhesiveness and can improve low-temperature output characteristics of an electrical storage device.

Moreover, according to the present disclosure, it is possible to provide a functional layer for an electrical storage device that has excellent post-cycling adhesiveness and can improve low-temperature output characteristics of an electrical storage device.

Furthermore, according to the present disclosure, it is possible to provide an electrical storage device that has excellent low-temperature output characteristics and a production method that enables good production of this electrical storage device.

The invention claimed is:

1. An adhesive composition for an electrical storage device comprising a polymer A, a polymer B, and a solvent, wherein
the polymer A includes a nitrile group-containing monomer unit and an alicyclic (meth)acrylic acid ester monomer unit,
the polymer A includes the alicyclic (meth)acrylic acid ester monomer unit in a proportion of not less than 50.0 mass % and not more than 90.0 mass %,
a value obtained by dividing a volume-average particle diameter of the polymer A by a volume-average particle diameter of the polymer B is not less than 1.2 and not more than 10.0.

2. The adhesive composition for an electrical storage device according to claim 1, wherein an alicyclic structure of the alicyclic (meth)acrylic acid ester monomer unit includes 5 to 12 carbon atoms.

3. The adhesive composition for an electrical storage device according to claim 1, wherein the polymer A includes the nitrile group-containing monomer unit in a proportion of not less than 0.1 mass % and not more than 45.0 mass %.

4. The adhesive composition for an electrical storage device according to claim 1, wherein the polymer A has a volume-average particle diameter of not less than 160 nm and not more than 1,500 nm.

5. A functional layer for an electrical storage device formed using the adhesive composition for an electrical storage device according to claim 1.

6. An electrical storage device comprising the functional layer for an electrical storage device according to claim 5.

7. A method of producing an electrical storage device that is a method of producing the electrical storage device according to claim 6, comprising:
a stacking step of stacking two or more components among a plurality of components included in the electrical storage device, via the functional layer for an electrical storage device, to obtain a stack; and
a pressing step of pressing the stack to adhere the two or more components to one another.

8. The method of producing an electrical storage device according to claim 7, wherein
the plurality of components of the electrical storage device includes two types of electrodes and a separator,
the method further comprises a step of providing the functional layer for an electrical storage device on at least one side of the separator to form a functional layer-equipped separator at an earlier stage than the stacking step, and
the functional layer-equipped separator and at least one of the two types of electrodes are stacked via the functional layer for an electrical storage device in the stacking step.

* * * * *